(12) United States Patent
Jones et al.

(10) Patent No.: US 10,157,478 B2
(45) Date of Patent: Dec. 18, 2018

(54) ENABLING USE OF THREE-DIMENSIONAL LOCATIONS OF FEATURES WITH TWO-DIMENSIONAL IMAGES

(71) Applicant: Intel Corporation, Santa Clara, CA (US)

(72) Inventors: Eagle Sunrise Jones, San Francisco, CA (US); Benjamin J. Hirashima, San Francisco, CA (US); Jordan H. Miller, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/338,457

(22) Filed: Oct. 31, 2016

(65) Prior Publication Data

US 2017/0046844 A1    Feb. 16, 2017

Related U.S. Application Data

(63) Continuation of application No. 14/020,873, filed on Sep. 8, 2013, now Pat. No. 9,519,973.

(51) Int. Cl.
*G06T 15/00* (2011.01)
*G06T 7/73* (2017.01)
(Continued)

(52) U.S. Cl.
CPC ............ *G06T 7/75* (2017.01); *G06T 7/579* (2017.01); *G06T 7/74* (2017.01); *G06F 3/04842* (2013.01);
(Continued)

(58) Field of Classification Search
CPC . G06T 2200/08; G06T 7/0044; G06T 7/0046; G06T 2200/24; G06T 2207/10028;
(Continued)

(56) References Cited

U.S. PATENT DOCUMENTS

| 7,516,039 B2 * | 4/2009 | McKitterick | G01C 7/06 180/116 |
| 8,976,172 B2 * | 3/2015 | Jones | G06T 7/579 345/419 |

(Continued)

OTHER PUBLICATIONS

Gemeiner, Peter, Peter Einramhof, and Markus Vincze. "Simultaneous motion and structure estimation by fusion of inertial and vision data." The International Journal of Robotics Research 26, No. 6 (2007): 591-605.*

(Continued)

*Primary Examiner* — Phu K Nguyen
(74) *Attorney, Agent, or Firm* — Hanley Flight & Zimmerman, LLC

(57) ABSTRACT

The disclosed embodiments provide a system that facilitates use of an image. During operation, the system uses a set of images from a camera on a device to obtain a set of features in proximity to the device, wherein the set of images comprises the image. Next, the system uses the set of images and inertial data from one or more inertial sensors on the device to obtain a set of three-dimensional (3D) locations of the features. Finally, the system enables use of the set of 3D locations with the image.

20 Claims, 7 Drawing Sheets

(51) Int. Cl.
  *G06T 7/579* (2017.01)
  *G06F 3/0484* (2013.01)
(52) U.S. Cl.
  CPC ...... *G06T 2200/08* (2013.01); *G06T 2200/24* (2013.01); *G06T 2207/10028* (2013.01); *G06T 2207/20104* (2013.01)
(58) Field of Classification Search
  CPC . G06T 2207/20104; G06T 7/74; G06T 7/579; G06F 3/04842
  USPC .......................................................... 345/419
  See application file for complete search history.

(56) References Cited

U.S. PATENT DOCUMENTS 9,519,973 B2 * 12/2016 Jones .................... G06T 7/0044
9,792,727 B2 * 10/2017 Jones ....................... G06T 17/20

OTHER PUBLICATIONS

Lobo, J., & Dias, J. (2003). Vision and inertial sensor cooperation using gravity as a vertical reference. IEEE Transactions on Pattern Analysis and Machine Intelligence, 25(12), 1597-1608.*

* cited by examiner

ENABLING USE OF THREE-DIMENSIONAL LOCATIONS OF FEATURES WITH TWO-DIMENSIONAL IMAGES

CROSS REFERENCE TO RELATED APPLICATIONS

This application is a continuation of, and hereby claims priority under 35 U.S.C. § 120 to, pending U.S. patent application Ser. No. 14/020,873, entitled "Enabling Use of Three-Dimensional Locations of Features with Two-Dimensional Images," by inventors Eagle S. Jones, Benjamin J. Hirashima and Jordan H. Miller, filed 8 Sep. 2013.

The subject matter of this application is related to the subject matter in a co-pending non-provisional application by inventor Eagle S. Jones, entitled "Three-Dimensional Scanning Using Existing Sensors on Portable Electronic Devices," having Ser. No. 13/716,139, and filing date 15 Dec. 2012.

BACKGROUND

Field

The disclosure relates to three-dimensional (3D) scanning. More specifically, the disclosure relates to techniques for using 3D scanning to enable the use of 3D locations of features with two-dimensional (2D) images containing the features.

Related Art

Three-dimensional (3D) scanning may be used to construct 3D models of environments and/or objects. The models may then be used in applications such as movie and video game production, industrial design, medical devices, reverse engineering, prototyping, architecture, construction, computer-aided design (CAD), 3D printing, and/or quality control. For example, 3D scanning may be performed to model a piece of furniture, create a blueprint of a building's interior, plan the arrangement and layout of objects within a confined space, and/or facilitate indoor and/or outdoor mapping and/or navigation.

To perform 3D scanning, 3D scanners typically construct a point cloud of the surface(s) of an object and/or environment by probing the surface(s). For example, a 3D scanner may acquire the shape of the object and/or environment using physical touch, a laser rangefinder, laser triangulation, structured light, modulated light, and/or conoscopic holography. The 3D scanner may also include visible-light sensors for capturing surface textures and/or colors, which may be used to fully reconstruct a 3D model of the object and/or environment.

The 3D scanner may thus require unwieldy, expensive, complex and/or specialized equipment such as articulated arms, lasers, light sources, and/or cameras arranged in specific configurations. Moreover, the resulting 3D model may contain a large data set that is difficult to manipulate and/or requires the use of specialized (e.g., computer-aided design (CAD)) software. Such disadvantages to 3D scanning may thus bar the use of conventional 3D scanners and 3D models in many consumer and/or portable applications.

Consequently, adoption and/or use of 3D scanning technology may be increased by improving the usability, portability, size, and/or cost of 3D scanners and/or 3D models produced by the 3D scanners.

SUMMARY

The disclosed embodiments provide a system that facilitates use of an image. During operation, the system uses a set of images from a camera on a device to obtain a set of features in proximity to the device, wherein the set of images comprises the image. Next, the system uses the set of images and inertial data from one or more inertial sensors on the device to obtain a set of three-dimensional (3D) locations of the features. Finally, the system enables use of the set of 3D locations with the image.

In one or more embodiments, the system also enables use of the 3D locations with one or more additional images from the set of images.

In one or more embodiments, the image and the one or more additional images are associated with at least one of a panorama and two or more images from an image sequence. For example, the image may be combined with the additional image(s) to enable inclusion of additional features for use with the 3D locations.

In one or more embodiments, using the set of images and the inertial data from the one or more inertial sensors to obtain the set of 3D locations of the features includes:
 (i) obtaining a new image from the set of images;
 (ii) predicting a two-dimensional (2D) location of a feature from the set of features in the new image;
 (iii) obtaining a measurement of the 2D location from the new image; and
 (iv) using a residual between the predicted 2D location and the measurement to estimate a 3D location of the feature.

In one or more embodiments, enabling use of the set of 3D locations with the image includes obtaining a selection of the image from the set of images, and providing the set of 3D locations and a set of two-dimensional (2D) locations of the features in the image.

In one or more embodiments, the 3D locations and the 2D locations are embedded in the image or provided separately from the image. For example, the 3D and 2D locations may be included in Exif data for the image or stored in a separate data source or structure from the image.

In one or more embodiments, enabling use of the set of 3D locations with the image further includes at least one of:
 (i) displaying the 2D locations of the features in the image;
 (ii) enabling selection of the features within the image;
 (iii) enabling selection of points outside of the features within the image; and
 (iv) enabling measurement of one or more attributes associated with the features or the points.

In one or more embodiments, the one or more attributes include at least one of a distance, an area, a volume, and a dimension.

In one or more embodiments, the set of features includes at least one of a corner, an edge, and a specialized feature. For example, the features may indicate the boundaries of the walls, ceilings, and/or floors of a room containing the portable electronic device. Alternatively, one or more features may identify windows, power outlets, furniture, and/or other objects in the room.

In one or more embodiments, the device is a portable electronic device.

BRIEF DESCRIPTION OF THE DRAWINGS

In the figures, like elements are denoted by like reference numerals.

DETAILED DESCRIPTION

In the following detailed description, numerous specific details are set forth to provide a thorough understanding of the disclosed embodiments. However, it will be apparent to those skilled in the art that the disclosed embodiments may be practiced without these specific details. In other instances, well-known features have not been described in detail to avoid unnecessarily complicating the description.

Methods, structures, apparatuses, modules, and/or other components described herein may be enabled and operated using hardware circuitry, including but not limited to transistors, logic gates, and/or electrical circuits such as application-specific integrated circuits (ASICs), field-programmable gate arrays (FPGAs), digital signal processors (DSPs), and/or other dedicated or shared processors now known or later developed. Such components may also be provided using firmware, software, and/or a combination of hardware, firmware, and/or software.

The operations, methods, and processes disclosed herein may be embodied as code and/or data, which may be stored on a non-transitory computer-readable storage medium for use by a computer system. The computer-readable storage medium may correspond to volatile memory, non-volatile memory, hard disk drives (HDDs), solid-state drives (SSDs), hybrid disk drives (HDDs), magnetic tape, compact discs (CDs), digital video discs (DVDs), and/or other media capable of storing code and/or data now known or later developed. When the computer system reads and executes the code and/or data stored on the computer-readable storage medium, the computer system performs the methods and processes embodied in the code and/or data.

The disclosed embodiments relate to a method and system for facilitating the use of three-dimensional (3D) scanning. More specifically, the disclosed embodiments relate to techniques for using 3D scanning to enable the use of 3D locations of features with two-dimensional (2D) images containing the features. For example, the 3D locations may facilitate understanding of the spatial and/or geometric properties of objects or spaces bounded by the features in the 2D images.

Figure 1:
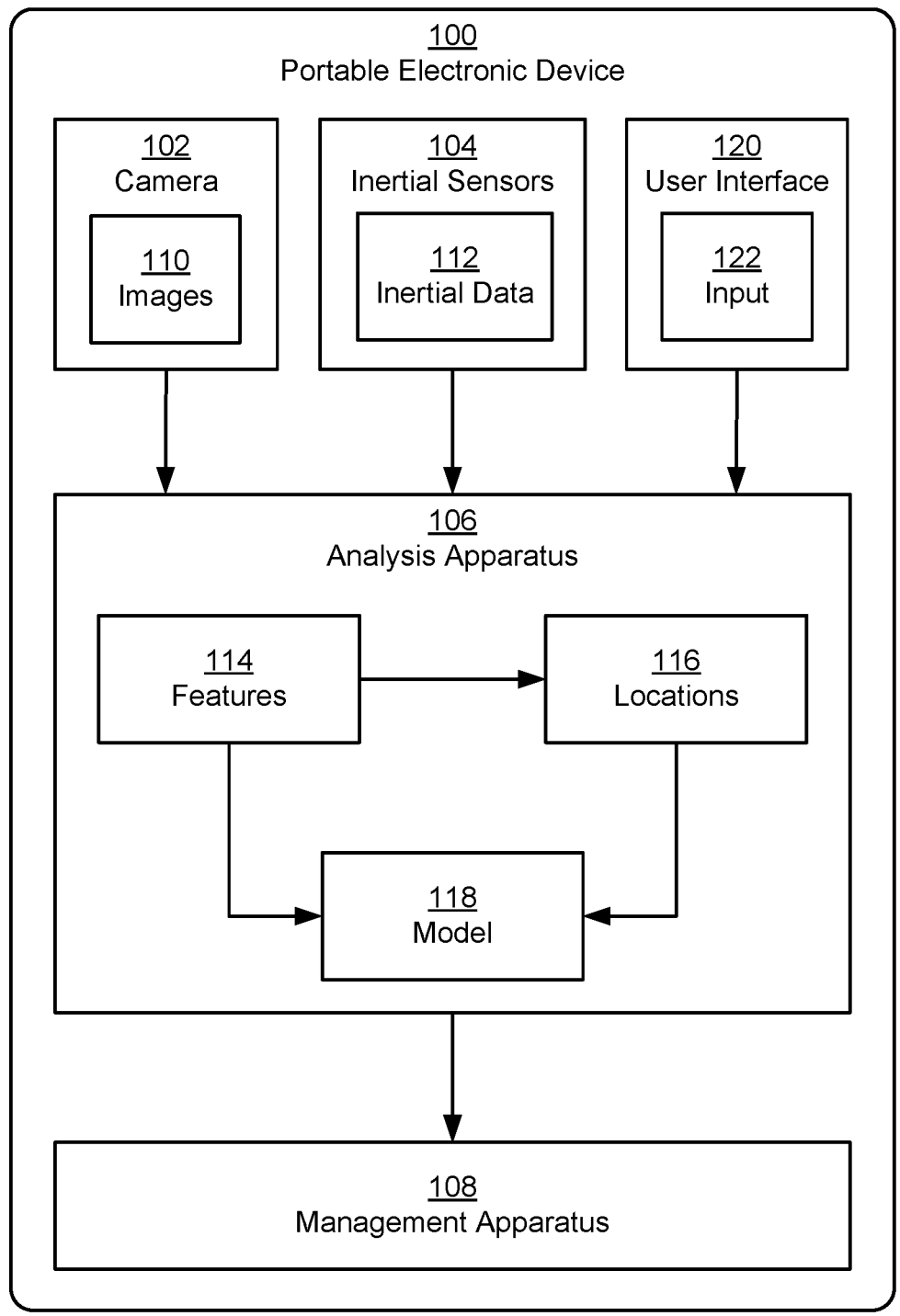
FIG. 1 shows a portable electronic device in accordance with one or more embodiments.

In one or more embodiments, the 3D scanning is performed using a portable electronic device such as a mobile phone, personal digital assistant, portable media player, tablet computer, and/or digital camera. As shown in FIG. 1, a portable electronic device 100 may include a camera 102 that captures a set of images 110 of the environment around portable electronic device 100. For example, camera 102 may include a lens and a charge-coupled device (CCD) and/or complementary metal-oxide-semiconductor (CMOS) image sensor built into the body of portable electronic device 100. Images 110 (e.g., still images, video, etc.) from camera 102 may then be stored in memory on portable electronic device 100 and/or processed by a processor (e.g., central processing unit (CPU), graphics-processing unit (GPU), etc.) on portable electronic device 100.

Portable electronic device 100 may also include one or more built-in inertial sensors 104, such as accelerometers and/or gyroscopes, which collect inertial data 112 related to changes in the position, orientation, acceleration, and/or angular velocity of portable electronic device 100. Inertial data 112 may be used by applications on portable electronic device 110 to change the orientation of a user interface 120 on portable electronic device 100 (e.g., between portrait and landscape), allow a user to provide input 122 to user interface 120 by moving and/or rotating portable electronic device 100, and/or perform other tasks for the user.

In one or more embodiments, portable electronic device 100 includes functionality to perform 3D scanning using existing sensors and/or hardware on portable electronic device 100, such as camera 102 and inertial sensors 104. In particular, an analysis apparatus 106 on portable electronic device 100 may obtain a set of features 114 in proximity to portable electronic device 100 from images 110. Analysis apparatus 106 may identify features 114 as areas within images 110 that are associated with high contrast and/or recognizable shapes and/or patterns. For example, analysis apparatus 106 may use a scale-invariant feature transform (SIFT) technique, Shi-Thomas technique, and/or other feature-detection technique to identify the corners and/or edges of a room containing portable electronic device 100, along with specialized features such as power outlets, windows, and/or furniture, as features 114 within the first image from images 110.

Analysis apparatus 106 may also obtain input 112 from the user to facilitate identification of features 114. For example, analysis apparatus 106 may display a live image from camera 102 within user interface 120 and request that the user select one or more features (e.g., corners, edges, specialized features, etc.) to be tracked as the user sees the feature(s) in the live image.

Next, analysis apparatus 106 may track features 114 across images 110 as images 110 are received from camera 102. For example, analysis apparatus 105 may use the Lucas-Kanade method, Horn-Schunk method, and/or other technique for estimating optical flow in images 110 to identify the same features in subsequent images 110 as portable electronic device 100 is translated and/or rotated with respect to the environment.

During tracking of features 114, analysis apparatus 106 may update a set of locations 116 of features 114 based on images 110 and inertial data 112 from inertial sensors 104. More specifically, analysis apparatus 106 may use images 110 to track locations 116 of features 114 relative to the position and orientation (e.g., pose) of portable electronic device 100. Analysis apparatus 106 may also use inertial data 112 to track the pose and/or motion of portable electronic device 100.

Inertial data 112 may thus be used to determine the scale by which locations 116 should be multiplied to determine the absolute distances of features 114 from portable electronic device 100. For example, analysis apparatus 106 may use inertial data 112 and multiple views of features 114 from images 110 to triangulate the absolute distances of features 114 from portable electronic device 100. At the same time, tracking of features 114 across images 110 may mitigate drift caused by noise during the integration of inertial data 112 (e.g., acceleration, angular velocity, etc.) from inertial sensors 104 to obtain motion and/or position information for portable electronic device 100. In other words, the combined analysis of images 110 and inertial data 112 may allow analysis apparatus 106 to accurately detect both the motion of portable electronic device 100 and locations 116 of features 114 around portable electronic device 100.

Analysis apparatus 106 may then use features 114 and locations to provide a model 118 of the environment around portable electronic device 100. As discussed in further detail below with respect to FIG. 2, model 118 may be used to estimate the 3D locations of features 114 based on measurements and predictions of two-dimensional (2D) locations of features 114 within images 110 and/or values of inertial data 112 from inertial sensors 104. For example, model 118 may be provided by an extended Kalman filter (EKF) that uses residuals between the measurements and predictions to adjust the state of the EKF and estimate the 3D locations of features 114.

After model 118 is created, a management apparatus 108 in portable electronic device 100 may use model 118 to perform one or more tasks for the user. More specifically, management apparatus 108 may enable use of the 3D locations with an image from images 110 and/or features 114 in the image, as discussed in further detail below.

Figure 2:
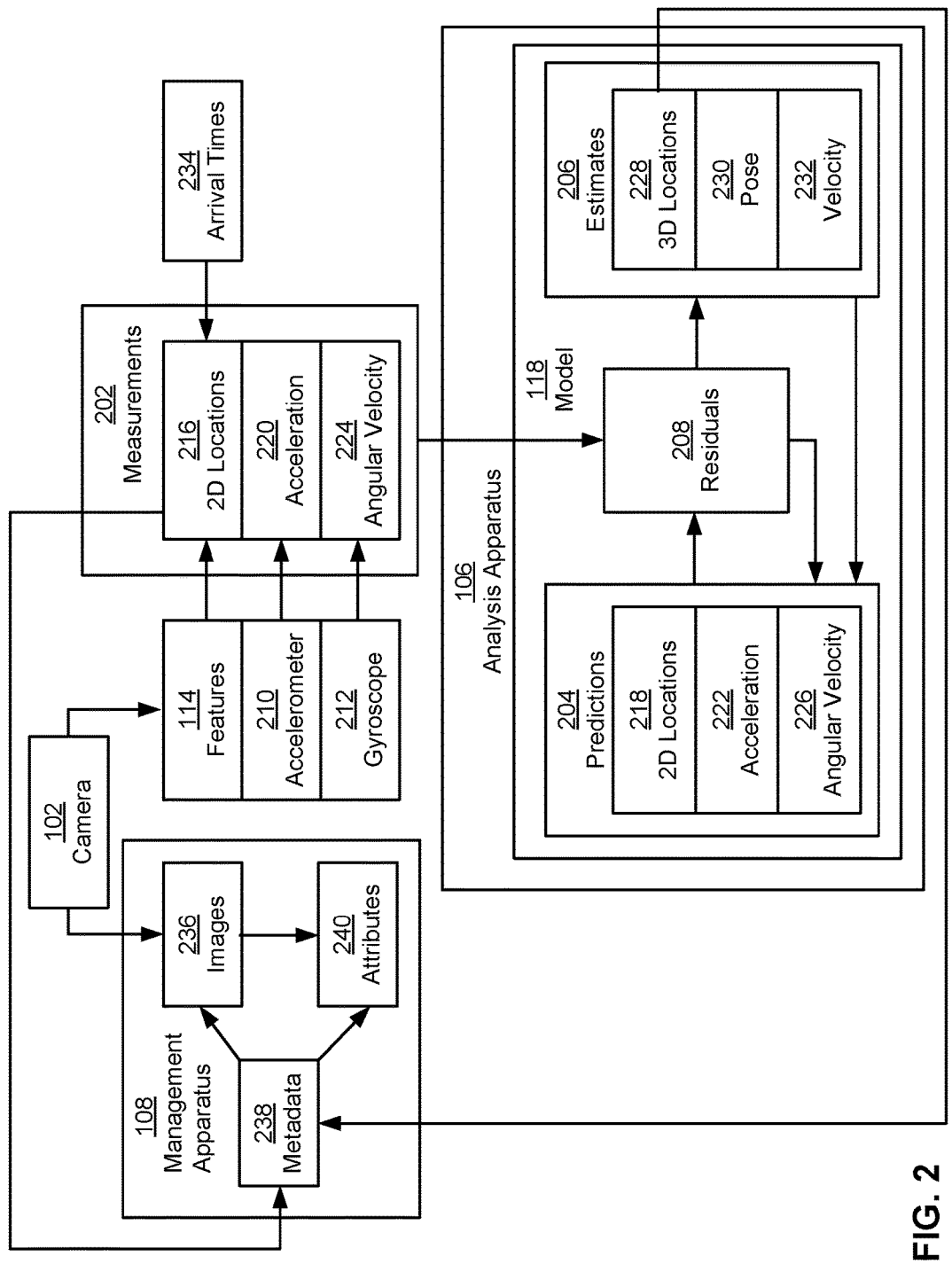
FIG. 2 shows a system for facilitating the use of one or more images in accordance with one or more embodiments.

FIG. 2 shows a system for facilitating the use of one or more images 236 in accordance with one or more embodiments. 3D locations 228 may be based on periodic measurements 202 of data from a set of built-in sensors on a device (e.g., portable electronic device 100 of FIG. 1), including camera 102, an accelerometer 210, and/or a gyroscope 212.

More specifically, a set of images (e.g., images 110 of FIG. 1) from camera 102 may be used to obtain a set of features 114 in proximity to the device, with measurements 202 of 2D locations 216 of features 114 obtained as pixel locations of regions of the images corresponding to features 114. Prior to identifying features 114 and/or obtaining 2D locations 216, the images may be pre-processed to remove distortion and/or optical aberrations caused by the lens and/or sensor of camera 102. As described above, features 114 may then be identified and tracked across the images using a number of feature-detection and/or optical-flow estimation techniques and/or user input from the user of the device.

Inertial data related to the motion of the device may also be obtained from one or more inertial sensors on the device. For example, measurements 202 of acceleration 220 and angular velocity 224 may be obtained from an accelerometer 210 and gyroscope 212, respectively, provided by an inertial measurement unit (IMU) on the device. To further facilitate tracking of features 114 across images, the inertial data may be used to determine the movement of the device between two consecutive images, and in turn, the amount by which features 114 are expected to shift between the images.

Measurements 202 may then be provided as input to model 118 and compared to a set of predictions 204 of 2D locations 218, acceleration 222, and/or angular velocity 226 by analysis apparatus 106 to obtain a set of estimates 206 of 3D locations 228 of features 114 and the pose 230 (e.g., position and orientation) and velocity 232 of the device. As mentioned above, analysis apparatus 106 may provide model 118 using an EKF that recursively makes estimates 206 of unknown states (e.g., 3D locations 228, pose 230, and velocity 232) based on measurements 202 of attributes related to the states (e.g., 2D locations 216, acceleration 220, angular velocity 224).

More specifically, the EKF may include a set of measurement equations that describe the relationships between measurements 202 and the unknown states. To obtain estimates 206, model 118 may use the measurement equations to provide a set of predictions 204 of 2D locations 218, acceleration 222, and angular velocity 226 for each set of measurements 202 based on previous estimates 206 and residuals 208 between previous predictions 204 and measurements 202 corresponding to the predictions.

Next, predictions 204 may be compared with the most recent set of measurements 202 for which predictions 204 are made to determine a new set of residuals 208 between predictions 204 and measurements 202. Residuals 208 may then be used to update the measurement equations and/or produce estimates 206 of 3D locations 228 and/or the device's motion (e.g., pose 230, velocity 232, etc.). Quality-of-fit for each feature may also be tracked during use of model 118 so that spurious features (e.g., non-stationary objects, visual artifacts, etc.) can be thrown away as outliers. Using images and inertial data to estimate 3D locations (e.g., 3D locations 228) of features in the images is discussed in a co-pending non-provisional application by inventor Eagle S. Jones, entitled "Three-Dimensional Scanning Using Existing Sensors on Portable Electronic Devices," having Ser. No. 13/716,139, and filing date 15 Dec. 2012, which is incorporated herein by reference.

In one or more embodiments, model 118 is used to enable the use of one or more images 236 from camera 102 with 3D locations 228 of features 114 in images 236. As shown in FIG. 2, analysis apparatus 106 and/or management apparatus 108 may obtain a selection of one or more images 236 as a subset of the images taken by camera 102 (e.g., images 110 of FIG. 1) and provide 3D locations 228 and 2D locations 216 of features 114 in images 236 as metadata 238 for images 236.

More specifically, analysis apparatus 106 and/or management apparatus 108 may automatically select images 236 as those that contain some or all of the identified features 114. Alternatively, analysis apparatus 106 and/or management apparatus 108 may obtain a user selection of images 236 from the set of images taken by camera 102 through a user interface (e.g., user interface 120 of FIG. 1). In addition, multiple images 236 may be selected from an image sequence from camera 102 and/or formed into a panorama for subsequent use with features 114 and/or 3D locations 228.

Similarly, analysis apparatus 106 and/or management apparatus 108 may provide metadata 238 in a number of ways. For example, analysis apparatus 106 and/or management apparatus 108 may embed 2D locations 216 and 3D locations 228 as Exchangeable image file format (Exif) data in images 236. Conversely, analysis apparatus 106 and/or management apparatus 108 may provide metadata 238 in a separate file and/or data structure from images 236. Metadata containing 2D and 3D locations of features in images is discussed in further detail below with respect to FIGS. 3A-3B.

Management apparatus 108 may further facilitate use of images 236 and metadata 238 by enabling the measurement of attributes 240 associated with features 114 using images 236 and metadata 238. For example, management apparatus 108 may provide a user interface that displays images 236 and 2D locations 216 within images 236 and enables selection of features 114 and/or other points within images 236.

Management apparatus 108 may then measure attributes 240 associated with the features and/or points. Continuing with the above example, management apparatus 108 may include functionality to measure an absolute distance between two selected features, two selected points along a line between the two features, and/or two points in a plane defined by three features. Management apparatus 108 may also be able to calculate an area of the plane and/or a surface area or volume of space bounded by two or more planes or represented by a combination of points and/or planes. Finally, management apparatus 108 may specify the dimensions of a line, plane, and/or 3D shape using the measured distances.

In turn, attributes 240 may facilitate understanding and/or use of spaces and/or objects in images 236. For example, images 236 and metadata 238 may be used to identify the dimensions of a space, which in turn may be used to identify, select, design, or place furniture, products, and/or signs into the space. Images 236 and metadata 238 may also be used to calculate distances, areas, volumes, weights (e.g., if densities are known), dimensions, and/or surface areas of objects to facilitate tasks such as calculating shipping costs based on shipping container dimensions, identifying luggage as carry-on or checked baggage, and/or verifying the conformity of a construction site to building codes and/or plans.

Those skilled in the art will appreciate that the system of FIG. 2 may be implemented in a variety of ways. As discussed above with respect to FIG. 1, camera 102, analysis apparatus 106, management apparatus 108, accelerometer 210, and gyroscope 212 may be provided by a portable electronic device such as a mobile phone, tablet computer, digital camera, personal digital assistant, and/or portable media player.

On the other hand, images 236 and metadata 238 may be provided using a surveyor tool, 3D scanner, and/or other device that includes camera 102, accelerometer 210, gyroscope 212, other built-in sensors (e.g., magnetometer, Global Positioning System (GPS) receiver, wireless transceiver, cellular radio), and/or analysis apparatus 106. Measurement of attributes 240 may then be performed by management apparatus 108 on the same device and/or one or more other electronic devices (e.g., portable electronic device, personal computer, server, etc.). For example, images 236 and metadata 238 may be transmitted from analysis apparatus 106 to a cloud computing system and/or server for storage. The same cloud computing system and/or server may then be used to measure attributes 240, or measurements of attributes 240 may be performed by a computer system and/or electronic device with functionality to communicate with the cloud computing system and/or server.

Figure 3A:
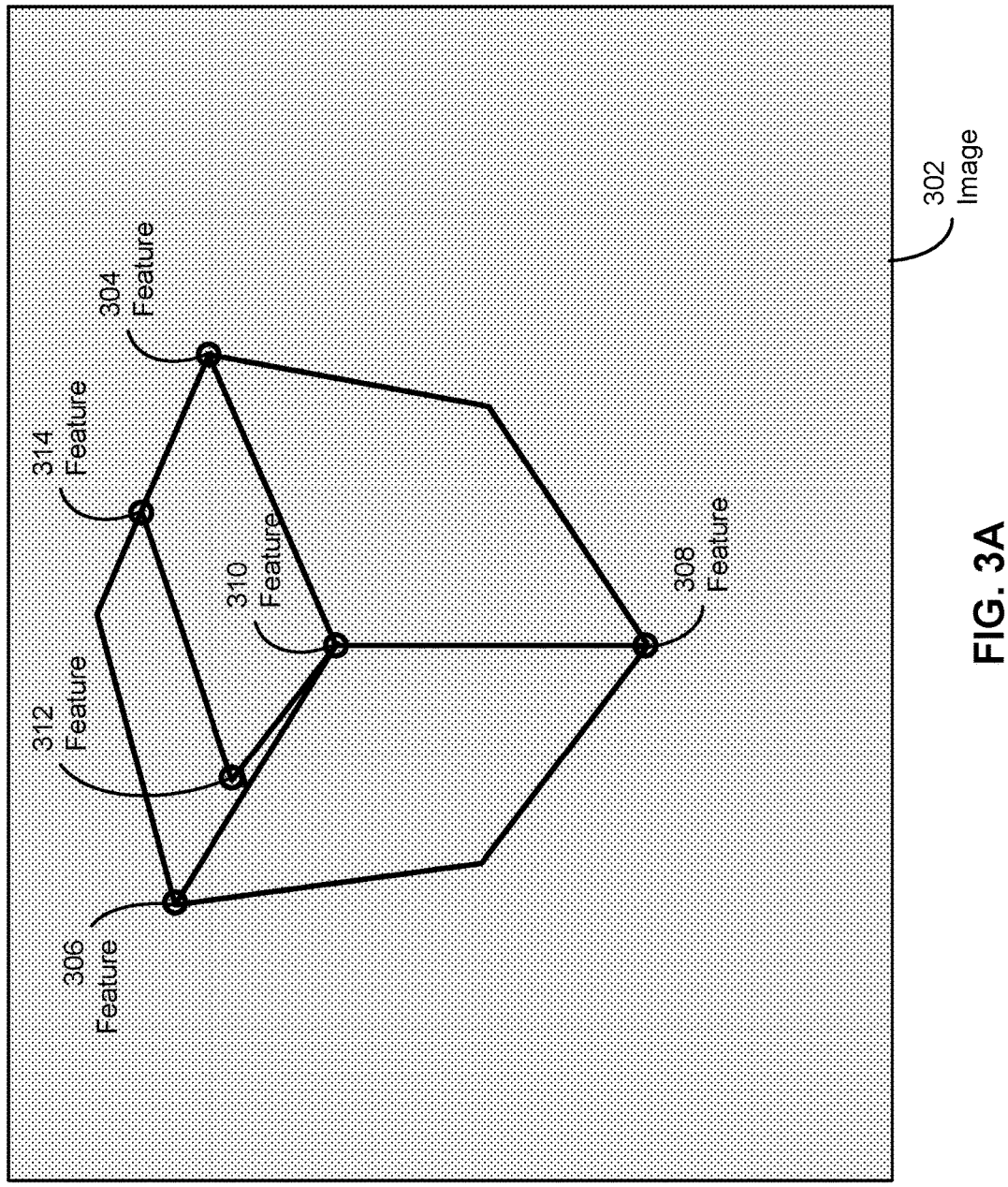
FIG. 3A shows an exemplary screenshot in accordance with one or more embodiments.

FIG. 3A shows an exemplary screenshot in accordance with one or more embodiments. More specifically, FIG. 3A shows a screenshot of a user interface for enabling use of an image 302 with a set of 3D locations of features 304-314 in the image. Image 302 may be obtained from a sequence of images captured by a camera (e.g., camera 102 of FIG. 1). For example, image 302 may be selected by a user of the user interface, created as a panorama of two or more images, and/or automatically selected and displayed by the user interface after the 3D locations have been determined from the sequence and/or inertial data accompanying the sequence.

As mentioned above, features 304-314 may be identified and/or tracked across a sequence of images that includes image 302. For example, features 304-314 may represent the corners of a box and/or flaps in the box. The 3D locations may then be estimated based on predictions and measurements of 2D locations of features 304-314, as well as inertial data collected from an accelerometer, gyroscope, and/or other inertial sensors on the same device as the camera. For example, the predictions may be compared to measurements of the 2D locations and/or inertial data to obtain residuals that are used to generate new estimates of the 3D locations, as described above and in the above-referenced application.

In addition, the 2D locations and 3D locations of features 304-314 may be provided as metadata for image 302, which may be embedded in image 302 (e.g., as Exif data) or included in a separate file or data structure from image 302. For example, metadata for image 302 may include the following:

id: 0
2d: 450.000000 108.000000
3d: 1.182933−0.332573−0.513143
id: 1
2d: 291.000000 177.000000
3d: 0.894475−0.005729−0.508530
id: 2
2d: 288.000000 348.000000
3d: 0.905975 0.000395−0.915695
id: 3
2d: 152.000000 89.000000
3d: 1.241294 0.275706−0.507048

Within the metadata, each feature may be represented by a numeric identifier (e.g., "id"), a 2D location (e.g., "2D ") in pixel coordinates for a 640-pixel by 480-pixel image, and a 3D location (e.g., "3D ") in meters. In particular, the feature 304 may have an identifier of 0, a 2D location of (450, 108), and a 3D location of (1.182933, −0.332573, −0.513143). Feature 310 may have an identifier of 1, a 2D location of (291, 177), and a 3D location of (0.894475, −0.005729, −0.508530). Feature 308 may be represented by identifier 2 and have a 2D location of (288, 348) and a 3D location of (0.905975, 0.000395, −0.915695). Finally, feature 306 may have an identifier of 3, a 2D location of (152, 89), and a 3D location of (1.241294, 0.275706, −0.507058).

The metadata may then be to identify features 304-314 within image 302. As shown in FIG. 3A, the 2D locations of features 304-314 are shown in image 302 as circular overlays within the user interface. The overlays may additionally be selected within the user interface and used to measure one or more attributes associated with features 304-314, as discussed in further detail below with respect to FIG. 3B.

Figure 3B:
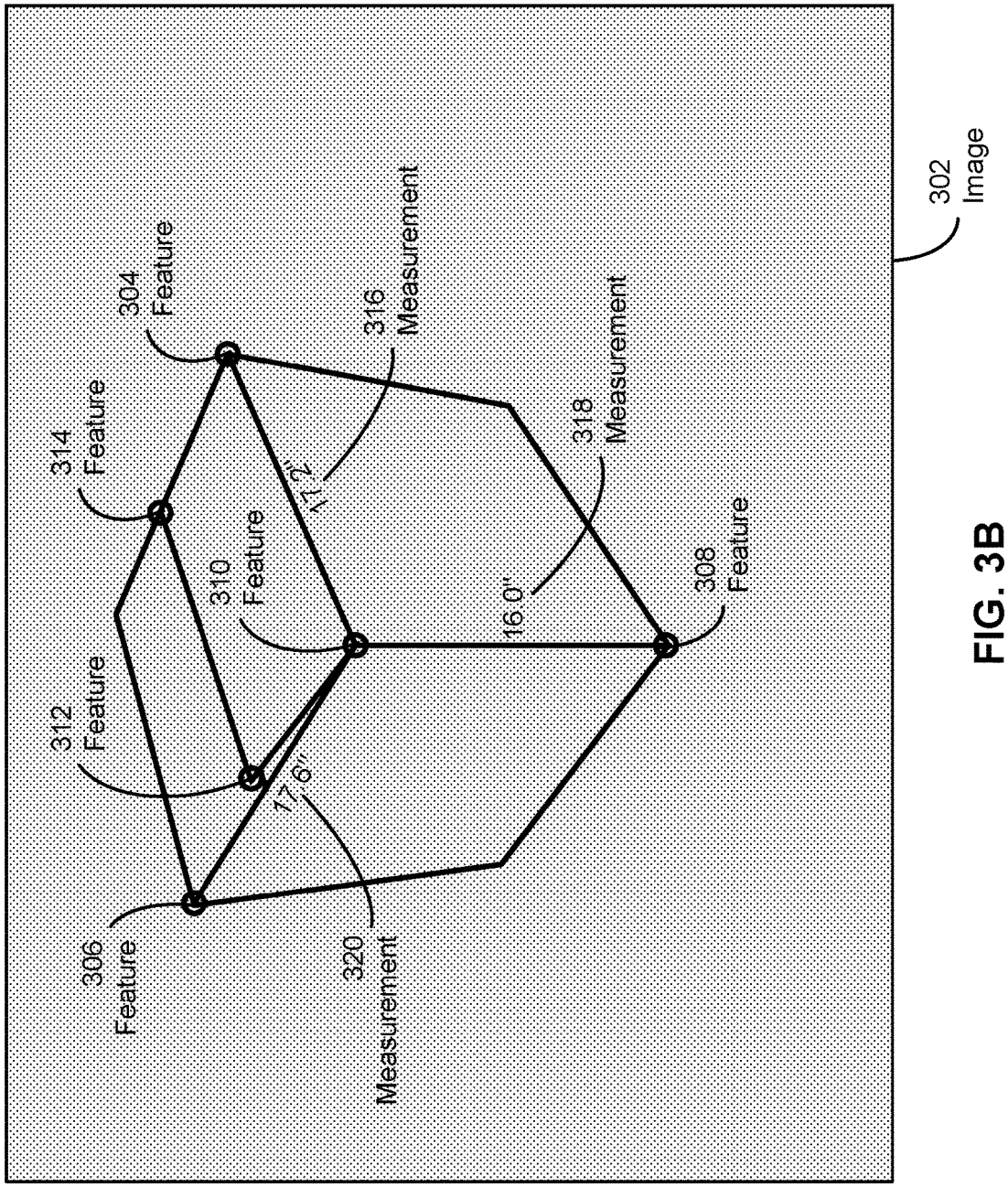
FIG. 3B shows an exemplary screenshot in accordance with one or more embodiments.

FIG. 3B shows an exemplary screenshot in accordance with one or more embodiments. More specifically, FIG. 3B shows a screenshot of the user interface of FIG. 3A after features 304-310 have been selected. For example, a user may select features 304-310 by tapping, clicking, highlighting, and/or otherwise interacting with regions of the user interface containing features 304-310.

In response to the selected features 304-310, the user interface displays a set of measurements 316-320 of attributes associated with features 304-310. For example, measurement 316 (e.g., 17.2") may represent the distance between feature 304 and feature 310, measurement 318 (e.g., 16.0") may represent the distance between feature 308 and feature 310, and measurement 320 (e.g., 17.6") may represent the distance between feature 306 and feature 310. Measurements 316-320 may be calculated from the 3D locations of features 304-310, as provided by metadata for image 302. For example, measurements 316-320 may be obtained from the exemplary metadata described above by calculating the distances between the respective features 304-310 using the 3D locations of features 304-310 in meters and converting the calculated distances into inches.

Measurements 316-320 may thus facilitate understanding and/or use of the object (e.g., box) bounded by features 304-310. For example, measurements 316-320 may be made by the user to calculate the dimensions of the box. The dimensions may then be used by the user to calculate the volume of the box for shipping purposes. Alternatively, the dimensions may facilitate placement of the box in a room, shelf, closet, vehicle, and/or other space, the dimensions of which may also be calculated using the user interface and a separate set of images, features, and/or 3D locations.

As discussed above, the user interface may further enable measurement of attributes not directly related to features 304-314. For example, the user interface may allow the user to select one or more points along a line between a selected pair of features (e.g., features 304-310) and measure distances between the pairs of selected points and/or features. Similarly, the user interface may allow the user to specify a plane using three features and/or points, measure distances between points in the plane, and/or define other planes using the points in the plane and/or other points in image 302. As a result, the user may specify various 3D points in the image by relating the 2D locations of the points to known 3D locations of features 304-314 and/or other points (e.g., between pairs of features, planes defined by features and/or points, etc.) in image 302. The user may then use the 3D points and locations to calculate distances, dimensions, areas, volumes, and/or other attributes related to the geometry of the points and/or locations.

Figure 4:
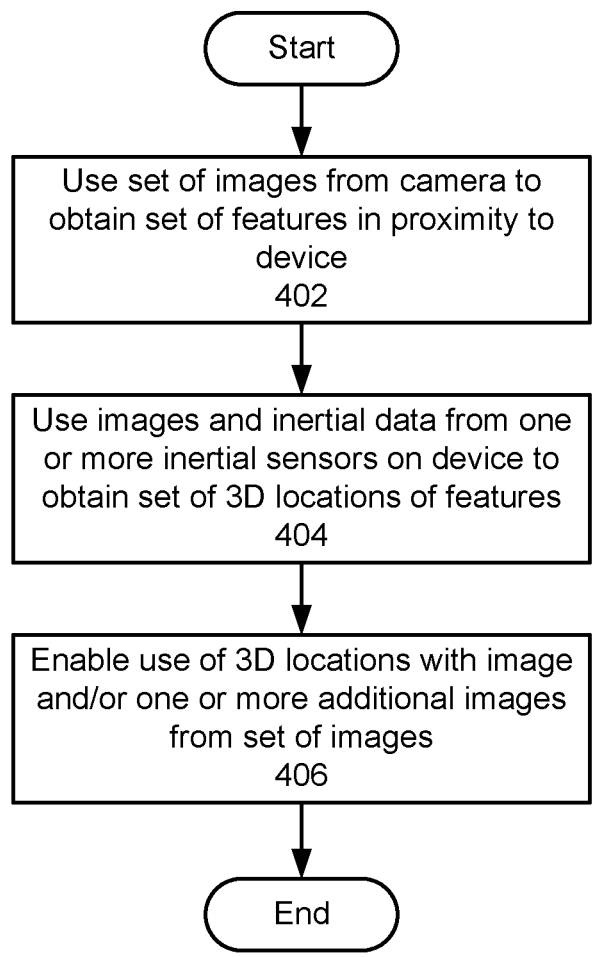
FIG. 4 shows a flowchart illustrating the process of facilitating use of an image in accordance with one or more embodiments.

FIG. 4 shows a flowchart illustrating the process of facilitating use of an image in accordance with one or more embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a set of images from a camera is used to obtain a set of features in proximity to a device (operation 402). The features may include corners, edges, and/or specialized features in the images. The device may be a portable electronic device, 3D scanner, surveyor tool, and/or other device with functionality to perform 3D scanning using the camera and inertial sensors such as an accelerometer and/or gyroscope.

Next, the images and inertial data from the inertial sensors are used to obtain a set of 3D locations of the features (operation 404). For each new image captured by the camera, a 2D location of each feature in the new image is predicted. Next, a measurement of the 2D location is obtained from the new image. Finally, a residual between the predicted 2D location and the measurement is used to estimate a 3D location of the feature. Such measuring and updating of the 2D locations and 3D locations of the features may continue until variations in the estimates of the 3D locations fall below a pre-specified threshold. For example, the camera may capture 30 images per second, while the accelerometer and gyroscope may each make 100 measurements per second. If the variations in the estimates of the 3D locations reach acceptable levels after 10 seconds, the 2D locations and 3D locations will have been updated with data from about 300 images and 1000 measurements each from the accelerometer and gyroscope.

Use of the 3D locations with an image and/or one or more additional images from the set of images is then enabled (operation 406), as described in further detail below with respect to FIG. 5. Such use of the 3D locations and image(s) may be provided by the same device used to obtain the 3D locations and image(s), or by a different device that obtains the 3D locations and image(s) from the device and/or another source.

Figure 5:
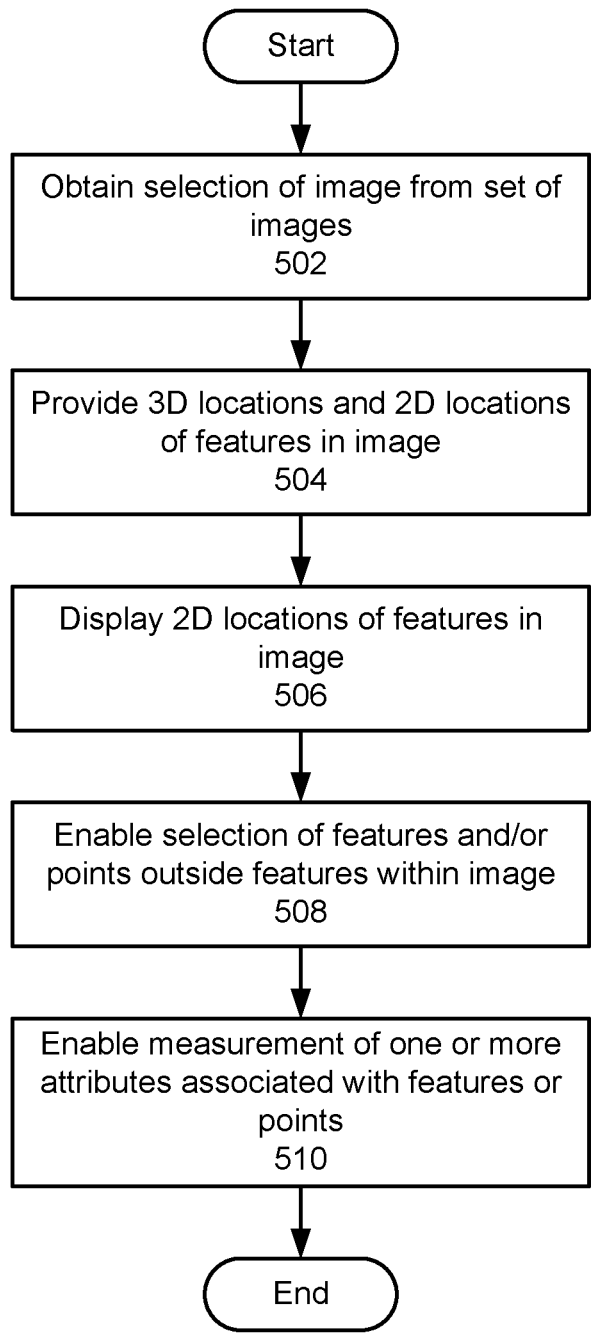
FIG. 5 shows a flowchart illustrating the process of enabling use of a set of 3D locations of features in an image with the image in accordance with one or more embodiments.

FIG. 5 shows a flowchart illustrating the process of enabling use of a set of 3D locations of features in an image with the image in accordance with one or more embodiments. In one or more embodiments, one or more of the steps may be omitted, repeated, and/or performed in a different order. Accordingly, the specific arrangement of steps shown in FIG. 5 should not be construed as limiting the scope of the embodiments.

First, a selection of the image from a set of images is obtained (operation 502). The selection may be provided by a user or automatically selected based on the inclusion and/or clarity of features in the image, the position of the image in the set, and/or other criteria. The image may also be used and/or combined with one or more additional images from the set. For example, two or more images may be stitched into a panorama and/or obtained from an image sequence to enable inclusion of additional features in the images.

Next, 3D locations and 2D locations of features in the image are provided (operation 504). The 3D and 2D locations may be embedded in the image or provided separately from the image. The image and locations may then be stored for subsequent use, or the locations may be used with the image to facilitate understanding of the spatial properties of the features once the locations are available.

During use of the 2D and 3D locations with the image, the 2D locations may be displayed in the image (operation 506). For example, graphical objects identifying the features may be displayed over the 2D locations of the features. Next, selection of the features and/or points outside the features within the image is enabled (operation 508). For example, a user may select one or more features by tapping or clicking on the feature, specifying a region containing the feature, and/or otherwise identifying the feature within a user interface containing the image. The user may additionally specify one or more points within a line, plane, and/or shape defined by the selected feature(s) and/or other previously selected points in the image.

Finally, measurement of one or more attributes associated with the features or points is enabled (operation 510). For example, the 3D locations of the selected points and/or features may be used to calculate a distance, area, volume, and/or dimension associated with the lines, planes, and/or objects represented by the selected points and/or features. In turn, the attributes may facilitate understanding of the spatial properties of the objects and/or spaces in the image.

Figure 6:
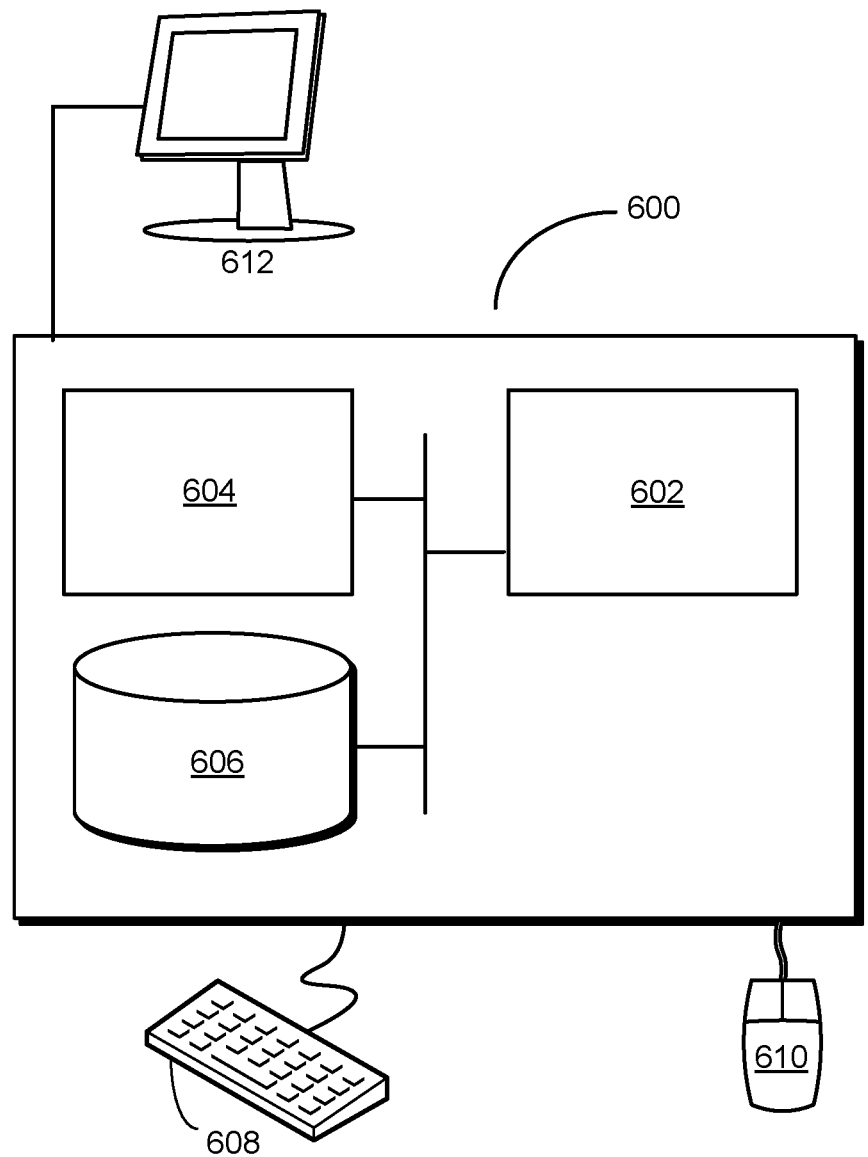
FIG. 6 shows a computer system in accordance with one or more embodiments.

FIG. 6 shows a computer system 600 in accordance with one or more embodiments. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for facilitating use of an image. The system may include a camera that obtains a set of images and one or more inertial sensors that obtain inertial data associated with the portable electronic device. The system may also include an analysis apparatus that uses the set of images to obtain a set of features in proximity to the portable electronic device. Next, the analysis apparatus may use the set of images and the inertial data to obtain a set of three-dimensional (3D) locations of the features. The system may also include a management apparatus that to enables use of the set of 3D locations with the image and/or one or more additional images from the set of images.

In addition, one or more components of computer system 600 may be remotely located and connected to the other components over a network. Portions of the present embodiments (e.g., camera, inertial sensors, analysis apparatus, management apparatus etc.) may also be located on different nodes of a distributed system that implements the embodiments. For example, the present embodiments may be implemented using a cloud computing system that processes images and/or inertial data from a remote portable electronic device and/or 3D scanner to enable use of 3D locations of features in the images with the images.

Although the disclosed embodiments have been described with respect to a limited number of embodiments, those skilled in the art, having benefit of this disclosure, will appreciate that many modifications and changes may be made without departing from the spirit and scope of the disclosed embodiments. Accordingly, the above disclosure is to be regarded in an illustrative rather than a restrictive sense. The scope of the embodiments is defined by the appended claims.

What is claimed is:

1. A computer-implemented method for facilitating use of an image, the method comprising:
    obtaining an image including a set of features, the image captured by a camera in a device during a proximity of the device to the set of features;
    identifying the set of features from metadata stored with the image,
        the metadata including a set of three-dimensional (3D) locations of the features in an environment around the device and a set of two-dimensional (2D) locations of the features in the image,
        wherein the 3D locations and the 2D locations form a subset of a 3D model generated using the image and inertial data from one or more inertial sensors on the device, and
        wherein the metadata omits a remainder of the 3D model that is not in the subset;
    calculating, using the set of 3D locations and the set of 2D locations to calculate, by executing an instruction with at least one processor, a measurement of an attribute associated with one or more points in the image; and
    causing the measurement to be displayed in a user interface of the computer system.

2. The computer-implemented method of claim 1, further including causing the 2D locations of the features in the image to be displayed in the user interface.

3. The computer-implemented method of claim 2, further including causing a graphical object identifying at least one of the features over the 2D locations of the features in the image to be displayed in the user interface.

4. The computer-implemented method of claim 1, further including obtaining, through the user interface, a selection of the one or more points in the image prior to calculating the attribute.

5. The computer-implemented method of claim 4, wherein the selection of the one or more points in the image is obtained in response to a detection of a user at least one of:
    tapping or clicking on the feature;
    specifying a region containing the feature; or
    specifying the one or more points within at least one of a line, plane, or shape defined by points in the image.

6. The computer-implemented method of claim 4, wherein using the set of 3D locations and the set of 2D locations to calculate the measurement of the attribute associated with the one or more points in the image includes:
    relating one or more 2D locations of the points to one or more of the 3D locations of the features; and
    using the one or more of the 3D locations to calculate the measurement.

7. The computer-implemented method of claim 1, further including generating the 3D model by:
    obtaining a new image from a set of images captured by the camera and a measurement of a 2D location, in the new image, of a feature from the set of features;
    providing the inertial data and the measurement as input to generate the 3D model;
    using the 3D model to predict a 2D location of the feature in the new image; and
    using a residual between the predicted 2D location and the measurement to estimate a 3D location of the feature.

8. The computer-implemented method of claim 1, wherein the attribute includes at least one of:
    a distance;
    an area;
    a volume; and
    a dimension.

9. The computer-implemented method of claim 1, wherein the device is a portable electronic device.

10. The computer-implemented method of claim 1, wherein the metadata is embedded in the image.

11. The computer-implemented method of claim 10, wherein the metadata is embedded as Exchangeable image file format (Exif) data in the image.

12. An apparatus comprising:
    one or more processors; and
    memory storing instructions that, when executed by the one or more processors, cause the apparatus to at least:
        obtain an image including a set of features, wherein the image is captured by a camera in a device during a proximity of the device to the set of features;
        identify the set of features from metadata stored with the image,
            wherein the metadata includes a set of three-dimensional (3D) locations of the features in an environment around the device and a set of two-dimensional (2D) locations of the features in the image,
            wherein the 3D locations and the 2D locations form a subset of a 3D model generated using the image and inertial data from one or more inertial sensors on the device, and
            wherein the metadata omits a remainder of the 3D model that is not in the subset;
        use the set of 3D locations and the set of 2D locations to calculate a measurement of an attribute associated with one or more points in the image; and
        cause the measurement to be displayed in a user interface.

13. The apparatus of claim 12, wherein the instructions, when executed by the one or more processors, cause the apparatus to cause the 2D locations of the features in the image to be displayed in the user interface.

14. The apparatus of claim 12, wherein displaying the 2D locations of the features in the image includes causing a graphical object identifying at least one of the features over the 2D locations of the features in the image to be displayed in the user interface.

15. The apparatus of claim 12, wherein the instructions, when executed by the one or more processors, cause the apparatus to obtain, through the user interface, a selection of the one or more points in the image prior to calculating the attribute.

16. The apparatus of claim 15, wherein the selection of the one or more points in the image is obtained in response to a detection of a user at least one of:
  tapping or clicking on the feature;
  specifying a region containing the feature; or
  specifying the one or more points within at least one of a line, plane, or shape defined by points in the image.

17. The apparatus of claim 12, wherein the instructions, when executed by the one or more processors, cause the apparatus to generate the 3D model by:
  obtaining a new image from a set of images captured by the camera and a measurement of a 2D location, in the new image, of a feature from the set of features;
  providing the inertial data and the measurement as input to generate the 3D model;
  using the 3D model to predict a 2D location of the feature in the new image; and
  using a residual between the predicted 2D location and the measurement to estimate a 3D location of the feature.

18. A non-transitory computer-readable storage medium comprising instructions that, when executed, cause at least one processor to at least:
  obtain an image including a set of features, the image is captured by a camera in a device during a proximity of the device to the set of features;
  identify the set of features from metadata stored with the image,
    wherein the metadata includes a set of three-dimensional (3D) locations of the features in an environment around the device and a set of two-dimensional (2D) locations of the features in the image,
    wherein the 3D locations and the 2D locations form a subset of a 3D model generated using the image and inertial data from one or more inertial sensors on the device, and
    wherein the metadata omits a remainder of the 3D model that is not in the subset;
  use the set of 3D locations and the set of 2D locations to calculate a measurement of an attribute associated with one or more points in the image; and
  cause the measurement to be displayed in a user interface of the computer system.

19. The non-transitory computer-readable storage medium of claim 18, wherein the instructions, when executed, cause the at least one processor to cause the 2D locations of the features in the image to be displayed in the user interface.

20. The non-transitory computer-readable storage medium of claim 19, wherein the instructions, when executed, cause the at least one processor to obtain, through the user interface, a selection of the one or more points in the image prior to calculating the attribute.

* * * * *